May 27, 1947.  N. JENSEN  2,421,123
HAND TRUCK
Filed April 5, 1946
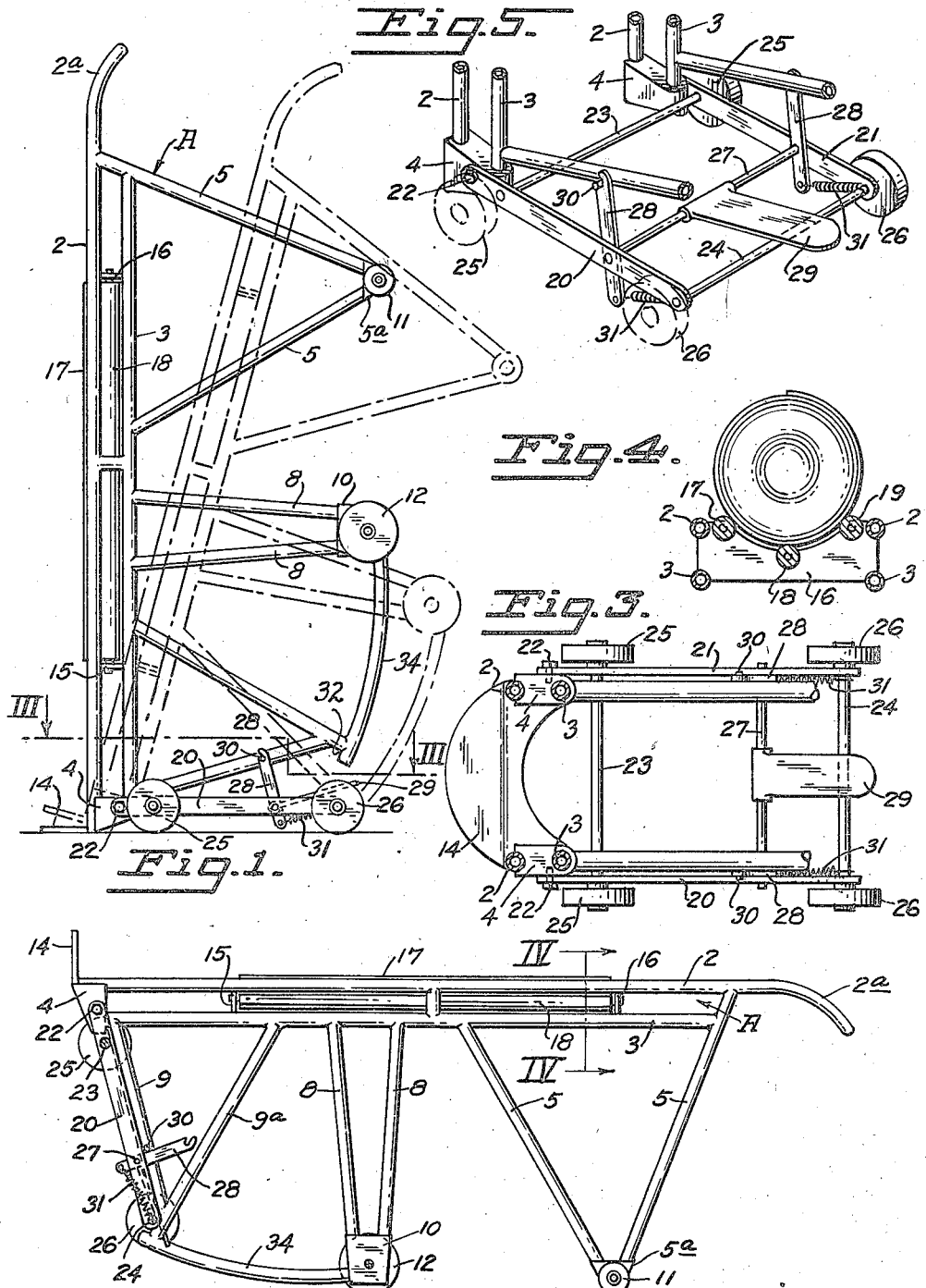
INVENTOR.
NELS JENSEN
BY Thomas Ostberg
ATTORNEY Patented May 27, 1947

2,421,123

UNITED STATES PATENT OFFICE 2,421,123

HAND TRUCK

Nels Jensen, Grass Valley, Calif.

Application April 5, 1946, Serial No. 659,770

6 Claims. (Cl. 280—49)

This invention relates to hand trucks of a type especially designed to move rolls of linoleum or the like from place to place and to support a roll of linoleum in a horizontal position where it may be readily unrolled for the purpose of display or any other purpose.

The object of the present invention is generally to improve and simplify the construction and operation of trucks of the character described; to provide a hand truck which assumes a vertical position and functions as a two wheel truck when picking up a roll of linoleum; to provide a hand truck which may be swung from a vertical to a semi-vertical position where it will function as a four-wheel truck and permit the loaded truck to be wheeled about; to provide a hand truck which may be swung from the semi-vertical position to a horizontal position where it will again function as a four-wheel truck that can readily be pushed or pulled about with the roll of linoleum in a horizontal position; to provide means whereby the weight of the truck and the linoleum roll supported thereby may be quickly and readily shifted from a vertical to a horizontal position or vice-versa with comparatively little effort on the part of the operator; and further, to provide means whereby a roll of linoleum in a horizontal position on the truck may be readily rotated about its axis to unroll the linoleum for display and also permit re-rolling of the linoleum after display.

The hand truck is shown by way of illustration in the accompanying drawings, in which:

Fig. 1 is a side elevation of the truck showing it in vertical position;

Fig. 2 is a side elevation of the truck showing it in horizontal position;

Fig. 3 is a horizontal section taken on line III—III of Fig. 1;

Fig. 4 is a cross section taken on line IV—IV of Fig. 2; and

Fig. 5 is a perspective of the auxiliary truck showing the shovel plate removed.

Referring to the drawings in detail, and particularly Figs. 1, 2 and 4, A indicates in general the main frame of a hand truck. This frame consists of a pair of spaced apart longitudinally extending tubular members 2 and 3 which are secured at their forward ends in blocks 4 and at their rear ends by one of a pair of rear leg members 5—5. There are two pairs of tubular bars with connecting blocks 4, one at each side of the truck, the upper pair being extended to form handles 2a; and there are three pairs of leg members, to wit the leg members 5—5, 8—8 and 9 and 9a. There is one rocker member 34 on each side, said rockers being secured at the forward ends to the leg members 9a and at their rear ends to blocks 10 which connect the lower ends of the leg members 8—8. The rear legs 5—5 are also connected at their lower ends by blocks 5a and these blocks, together with the blocks 10, serve as journal supports for wheels indicated at 11 and 12.

The side frames of the truck are transversely connected and this is accomplished by providing the shovel plate 14 which is secured to and between the blocks 4—4. Also there are a pair of transversely extending plates 15 and 16 (see Figs. 1, 2 and 4) which are welded or otherwise secured to the two tubular members 2—2 and 3—3. These last named transverse plates 15 and 16 also serve another function, to wit that of bearing members for three longitudinally extending rollers 17, 18 and 19, the purpose of which will hereinafter be described.

By referring to Figs. 1, 2, 3 and 5, it will be noted that a pair of side bars 20 and 21 are provided and that they are pivotally secured at their forward ends as indicated at 22 to the exterior surfaces or sides of the blocks 4—4. These side bars are connected by transverse bars 23 and 24 and said bars also function as journals for two pairs of wheels indicated at 25—25 and 26—26. A shaft 27 is journaled between the side bars about midway of the bars 23 and 24. Secured on the shaft 27 is a pair of latch arms 28—28 and a foot treadle 29. The latch bars are notched at their upper ends to engage and receive pins 30 carried by the legs 9 and are normally retained in engagement with said pins by springs 31 which are connected with the lower ends of the latch arms.

The side bars 20 and 21 together with the wheels 25—25 and 26—26 supporting the same forms what may be termed an auxiliary truck and this truck is pivotally attached to the main frame at 22—22. Again it may be said that the main frame is pivotally supported on the auxiliary truck when assuming either the vertical position indicated in full lines or the dotted line position shown in Fig. 1 and that the main frame is supported in the horizontal position by the wheels 11 and 12.

In actual practice the truck is operated as follows. If a vertically disposed roll of linoleum is to be removed from a storeroom and brought into for instance a display or salesroom, the salesman or helper first raises the hand truck to assume the vertical position shown in Fig. 1 where it is entirely supported by the wheels of the auxiliary truck. In this position the shovel plate rests parallel to and on the floor and by pushing the truck as a whole against the linoleum roll to be moved and slightly tilting the roll away from the truck, the shovel plate will pass under the end of the roll.

If the truck as a whole, with the linoleum roll on it, is to be placed in a horizontal position, the helper after placing the shovel plate under the end of the linoleum roll tilts it back towards the truck and at the same time places one foot on the treadle plate 29. In doing so he unhooks the latches with relation to the pins 30 and thereby permits the main frame to swing about the pivots 22 until the forward hook ends 32 of the rockers 34 engage the rear cross bar 24. By a continued pull in the same direction, the load pivots about the wheels 26 and is transferred to the rockers. It is then swung about the rockers until the load is finally transferred to the wheels 11 and 12. In this position the truck may be wheeled out into the display room and as the roll is now in a horizontal position, the free end of the linoleum may be grasped and pulled outwardly or away from the truck. The linoleum roll rotates freely as it is supported by the rollers 17, 18 and 19, journaled between the transverse plates 15 and 16 and it may obviously be just as easily re-rolled after display. The weight of the linoleum roll when in horizontal position is slightly greater towards the handle end than the shovel end 14. Hence, there is no tendency for the hand truck to up-end at any time. Again, comparatively little effort is required when returning the roll and truck to vertical position as a comparatively small lift exerted on the handle 7 will transfer the load to the rockers and from the rockers to the rollers 26 and finally the rollers 25. When the truck swings from the semi-vertical dotted line position shown in Fig. 1 to the full line position, the latches automatically engage the pins 30 and thereby lock the main frame of the truck in vertical position with relation to the auxiliary truck and it cannot be returned to the dotted line position until the helper depresses the foot treadle and releases the latches. After the latches have been released, the main frame of the truck swings about the pivots 22 until the forward hook ends of the rocker members engage the cross bar 24 and the auxiliary truck remains in engagement with the forward ends of the rockers as shown in Fig. 2 until returned to a vertical position as the latches 28 engage the pins 30 with sufficient force to hold the auxiliary truck in this position.

It has previously been stated that the truck, whether loaded or unloaded, is swung with very little effort from vertical to horizontal position, or vice versa. This is entirely due to the placing of the wheels 11, 12, 25 and 26. In other words the load is gradually shifted from one to the other. Hence, the effort of lifting is comparatively small. The truck as a whole is simple and substantial in construction. Few parts are employed and as it may be wheeled about both in the vertical and in the horizontal position, its utility is materially increased.

Having thus described my invention, what I claim and desire to secure by Letters Patent is:

1. A truck for handling and displaying rolls of linoleum or the like, comprising an elongated frame terminated in handles at one end and a shovel plate at the other end, an auxiliary truck upon which the frame is pivoted and supported when assuming a vertical position, said frame also adapted to assume a semi-vertical position on the auxiliary truck, means for locking the frame against pivotal movement on the auxiliary truck when in a vertical position, other means for supporting the frame on the auxiliary truck in the semi-vertical position, a first and a second pair of supporting wheels secured to the frame rearwardly of the truck to support the frame in a horizontal position, and a pair of rocker members secured to the frame at a point adjacent the first pair of supporting wheels and extending forward to the auxiliary truck, said rocker supporting the frame when it is tilted from a vertical position on the truck to a horizontal position.

2. A truck for handling and displaying rolls of linoleum or the like, comprising an elongated frame terminated in handles at one end and a shovel plate at the other end, an auxiliary truck upon which the frame is pivoted and supported when assuming a vertical position, said frame also adapted to assume a semi-vertical position on the auxiliary truck, means for locking the frame against pivotal movement on the auxiliary truck when in a vertical position, other means for supporting the frame on the auxiliary truck in the semi-vertical position, a first and a second pair of supporting wheels secured to the frame rearwardly of the truck to support the frame in a horizontal position, a pair of rocker members secured to the frame at a point adjacent the first pair of supporting wheels and extending forward to the auxiliary truck, said rocker supporting the frame when it is tilted from a vertical position on the truck to a horizontal position, and a plurality of spaced rollers journaled on the frame and extending longitudinally thereof to support a roll of linoleum when the frame assumes a horizontal position.

3. A truck for handling and displaying rolls of linoleum or the like, comprising an elongated frame terminated in handles at one end and a shovel plate at the other end, an auxiliary truck upon which the frame is pivoted and supported when assuming a vertical position, said frame also adapted to assume a semi-vertical position on the auxiliary truck, means for locking the frame against pivotal movement on the auxiliary truck when in a vertical position, other means for supporting the frame on the auxiliary truck in the semi-vertical position, a first and a second pair of supporting legs secured to the frame, the first of said pairs of legs being adjacent the handle end of the frame and the second pair substantially midway of the length of the frame, a third pair of supporting legs secured to the frame forward of the second pair, and rocker members connecting the second and third pairs of supporting legs.

4. A truck for handling and displaying rolls of linoleum or the like, comprising an elongated frame terminated in handles at one end and a shovel plate at the other end, an auxiliary truck upon which the frame is pivoted and supported when assuming a vertical position, said frame also adapted to assume a semi-vertical position on the auxiliary truck, means for locking the frame against pivotal movement on the auxiliary truck when in a vertical position, other means for supporting the frame on the auxiliary truck in the semi-vertical position, a first and a second pair of supporting legs secured to the frame, the first of said pairs of legs being adjacent the handle end of the frame and the second pair substantially midway of the length of the frame, a third pair of supporting legs secured to the frame forward of the second pair, rocker members connecting the second and third pairs of supporting legs, and wheels journaled on the first and second pair of legs to support the frame in a horizontal position.

5. A truck for handling and displaying rolls of linoleum or the like, comprising an elongated frame terminated in handles at one end and a shovel plate at the other end, front, intermediate and rear pairs of supporting legs secured to the frame, wheels journaled on the rear and intermediate pairs of legs, rocker members connecting the front and intermediate pairs of supporting legs, an auxiliary truck, a pivotal connection between the front end of the frame and the front end of the auxiliary truck, a front and a rear axle on the truck, a pair of wheels on each axle, said auxiliary truck supporting the frame when swung to a vertical position, and a latch mechanism on the auxiliary truck for securing the frame against pivotal movement when in a vertical position.

6. A truck for handling and displaying rolls of linoleum or the like, comprising an elongated frame terminated in handles at one end and a shovel plate at the other end, front, intermediate and rear pairs of supporting legs secured to the frame, wheels journaled on the rear and intermediate pairs of legs, rocker members connecting the front and intermediate pairs of supporting legs, an auxiliary truck, a pivotal connection between the front end of the frame and the front end of the auxiliary truck, a front and a rear axle on the truck, a pair of wheels on each axle, said auxiliary truck supporting the frame when swung to a vertical position, a latch mechanism on the auxiliary truck for securing the frame against pivotal movement when in a vertical position, manually actuated means for releasing the latch mechanism to permit tilting of the frame to a semi-vertical position on the auxiliary truck, and hook members forming an extension of the rockers to engage the rear axle of the auxiliary truck to support the frame when in semi-vertical position.

NELS JENSEN.